United States Patent [19]

Ukai et al.

[11] Patent Number: 4,702,483
[45] Date of Patent: Oct. 27, 1987

[54] MECHANICAL SHAFT JOINT BOOT

[75] Inventors: Mikio Ukai, Nagoya; Ryoji Okumoto, Aichi, both of Japan

[73] Assignee: Toyoda Gosei Co., Ltd., Nishikasugai, Japan

[21] Appl. No.: 850,693

[22] Filed: Apr. 11, 1986

[30] Foreign Application Priority Data

Apr. 13, 1985 [JP] Japan .................................. 60-79101

[51] Int. Cl.$^4$ ............................ F16D 3/84; F16J 15/52
[52] U.S. Cl. ............................. 277/212 FB; 74/18.1; 403/51; 464/175
[58] Field of Search ................. 277/212 FB; 464/175; 74/18.1; 403/50, 51

[56] References Cited

U.S. PATENT DOCUMENTS

| 3,063,266 | 11/1962 | Rabson | 464/175 X |
| 3,511,061 | 5/1970 | Burckhardt | 277/212 FB X |
| 3,623,340 | 11/1971 | Maas | 464/175 |
| 3,830,083 | 8/1974 | Hadick et al. | 277/212 FB X |
| 4,210,002 | 7/1980 | Dorf | 464/175 |
| 4,235,427 | 11/1980 | Bialobrzeski | 277/212 FB X |

FOREIGN PATENT DOCUMENTS 2945234 5/1981 Fed. Rep. of Germany ...... 464/175

Primary Examiner—Allan M. Shoap
Attorney, Agent, or Firm—Cushman, Darby & Cushman

[57] ABSTRACT

A mechanical shaft joint boot of a polymeric elastomer is provided with bellows between a large-diameter ring and a small-diameter ring, a first crest of the bellows being formed between the large-diameter ring the small-diameter ring after the first trough and a second trough being formed so as to have a smaller apical diameter than that of the first trough, and a circumferential convex strip is formed on the sidewardly inclined surface of the first crest on the inner side of the first trough and/or on the respectively opposed inside surface of the second trough. Therefore, the second trough is pushed toward the side of the small-diameter ring and is not held between the first trough and the driving shaft on the compressed side during a crossing movement, which reduces the compression distortion and increases the durability of the boot.

3 Claims, 8 Drawing Figures

4,702,483

MECHANICAL SHAFT JOINT BOOT

BACKGROUND OF THE INVENTION

The present invention relates to a mechanical shaft joint boot which is made of polymeric elastomer such as rubber and provided with bellows between a large-diameter ring and a small-diameter ring, the first crest of the bellows (numbered from the large-diameter side, the troughs being serially numbered from the same side hereinafter) being formed between the large-diameter and small-diameter rings after the first trough. More particularly, the invention relates to a boot suitable for a mechanical shaft joint of a constant velocity-type which provides a joint between a driving shaft and an axle of a passenger car.

Such a constant velocity-type mechanical shaft joint boot 31 (referred to as boot hereinafter) has heretofore had such a structure that the first crest 39 of the bellows 36 between the large-diameter ring 33 and the small-diameter ring 35 has been directly connected to the large-diameter ring 33, as shown in FIG. 1. However, there is a tendency for engine compartments to be made small nowadays as motor cars are often designed with front engine front drive (thereby providing an increase in the size of the passenger compartment). It has therefore become desirable for a joint part and a boot to be of such a design that the boot has a small circumferential diameter, i.e. the space occupied by the first crest 39 (containing a whirling property) must be minimized. A boot 21, as shown in FIG. 2, is being placed on the market, in which a first trough 28 is interposed between the large-diameter ring 23 and the first crest 29 of the bellows 26 provided between large-diameter and small-diameter rings 23 and 25. In the figures, reference numeral 11 denotes a driving shaft and reference numeral 12 denotes a shaft joint.

However, if the circumferential diameter of the first trough is made small so as to further restrain the whirling property, the boot of the above-described type (the boot shown in FIG. 2) has suffered the following problems which need to be overcome: (a) It might first be considered that making the circumferential diameter of the first trough 28 smaller (the trough thus being deepened) would attain the purpose of restraining the whirling property of the first crest 29 which represents the maximum circumferential diameter of the boot. However, by deepening the first trough, the first trough 28 was made susceptible to being broken when disposed between a socket 13 and driving shaft 11 where a large angle is formed between the axis of the driving shaft 11 and the axis of the socket 13 (hereinafter referred to as "crossing angle"), reduction in the circumferential diameter of the first trough 28 thus being limited. (b) Next, it might be considered feasible to decrease the circumferential diameters of others of the troughs, i.e. the ones on the small-diameter ring side of the second trough 27, but if the driving shaft 11 and the socket 13 made a crossing movement with a crossing angle of 30° (FIG. 3), the second trough 27 would then be brought into a state of being held between the first trough 28 with the increased circumferential diameter and the driving shaft 11, and the distortion would then be particularly concentrated at the region A in the figure so that the bending fatigue of the second trough 27 would thereby be accelerated leading to a reduction in the durability of the boot 21.

SUMMARY OF THE INVENTION

It is an object of the present invention to provide a boot having a second trough with increased durability in which the compression distortion is prevented from being concentrated at the second trough by precluding any possibility of the second trough being held between the first trough and the driving shaft.

It is another object of the present invention to provide a boot which has troughs capable of being made small in size and thus satisfying the requirement for small size, as well as increasing its durability.

The boot of the present invention is formed such that the second trough is pushed toward the small-diameter side by forming circumferential convex strips, which contact the opposite inside inclined surface on the compressed side in a crossing movement, on the sidewardly inclined surface of the first crest on the inner side of the first trough and/or the sidewardly inclined surface of the first crest on the inner side of the second trough which is opposite to that on the first trough.

DESCRIPTION OF THE PREFERRED EMBODIMENT

An embodiment of the present invention will be explained below with reference to the drawings (FIGS. 4 to 8).

Figure 2:
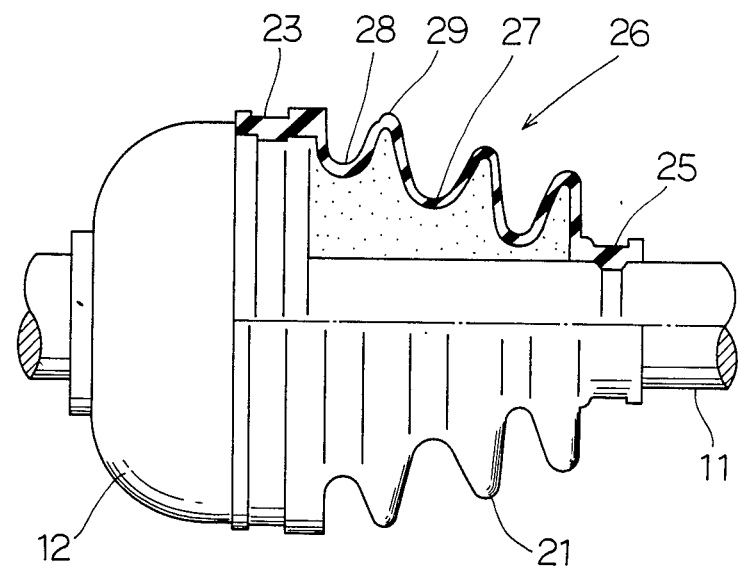
FIG. 2 is a half sectional view of a mounting situation showing a boot of the conventional type in which the first crest is connected to the large-diameter ring through the first trough.
Figure 4:
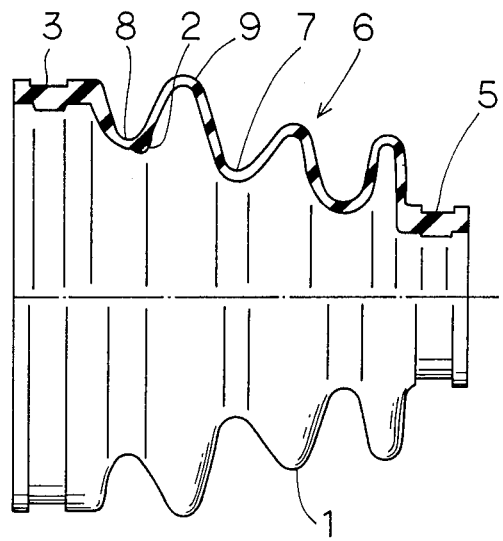
FIG. 4 is a half section view of a boot showing an embodiment of the present invention.
Figure 5:
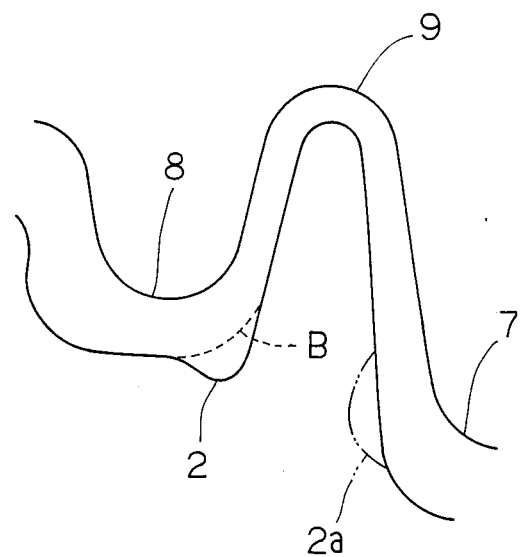
FIG. 5 is a partially enlarged sectional view of the boot showing the convex strips.

The boot 1 of this embodiment comprises a bellows 6 disposed between a large-diameter ring 3 and a small-diameter ring 5 in a similar manner to the conventional boot shown in FIG. 2, the first trough 8 being formed between the first crest 9 and the large-diameter ring 3. In effect, the bellows 6 extending between the large diameter ring 3 and the small diameter ring 5 is a tubular corrugated structure comprising a series of crests intercalated with a series of troughs, in alternation with one another, each crest having its apex disposed convex-outwardly and each trough having its apex disposed convex-inwardly. In this alternating series, counting from the large diameter ring 3, a first trough 8 occurs first, then a first crest 9, then a second trough 7, and so on, in alternation, to the small diameter end 5. As is apparent, in addition to its apex, each crest is formed by two oppositely obliquely-extending side walls. Likewise, each trough in addition to its apex, is formed by two oppositely obliquely-extending side walls. As is further apparent, the right side wall of the first trough 8 is exactly the same wall as the left side wall of the first crest 9, and the right side wall of the first crest 9 is exactly the same wall as the left side wall of the second trough 7, and so on, to the small diameter ring 5. (For convenience in description, the side wall of each trough or crest which is nearer the large diameter ring 3 will be designated its first side wall and the other side wall of the same trough or crest will be designated its second side wall.) So far, this description (but for the numbering) is equally apt for the conventional structure shown in FIG. 2 and the embodiment of the invention as shown in FIG. 4. This embodiment is characterized in that solid convex strips 2 are formed in the circumferential direction on the sidewardly inclined inner surface of the first side wall of the first crest 9, which is the second side wall of the first trough 8.

Figure 3:
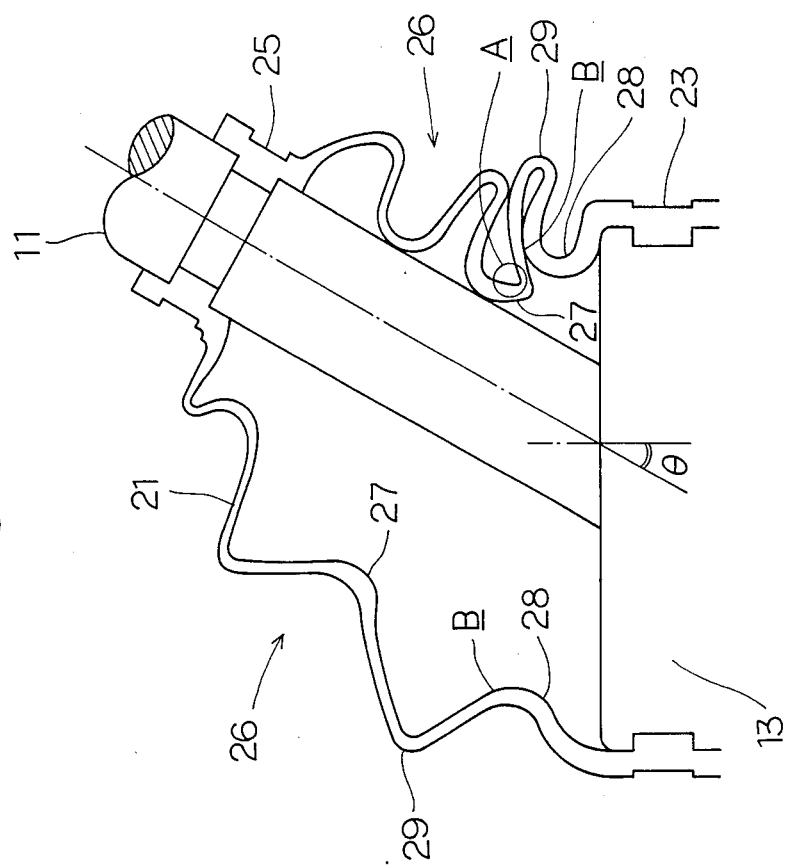
FIG. 3 is an X-ray fluoroscopic view of the boot shown in FIG. 2 in a case where the crossing angle $\theta$ of the driving shaft is 30°.

It is preferable to form this convex strip 2 in the circumferential direction on the surface B which forms a section (shown by the dotted line in FIG. 5) in the sidewardly inclined surface of the first crest on the inner side of the first trough 28 in the conventional type because the surface B of section contacts the second trough 27 during the crossing movement of the driving shaft 11, as shown in FIG. 3, such convex strip 2 being suitable for producing the functions described below.

As the polymeric elastomer which comprises the material for forming the boot of the present invention, rubber such as NR, NBR, SBR, BR, and CR, and TPE of urethane, vinyl, polyester, or polyolefin type may be exemplified here. With respect to the moulding method, rubber is subjected to injection moulding and TPE is subjected to injection blow moulding.

Figure 6:
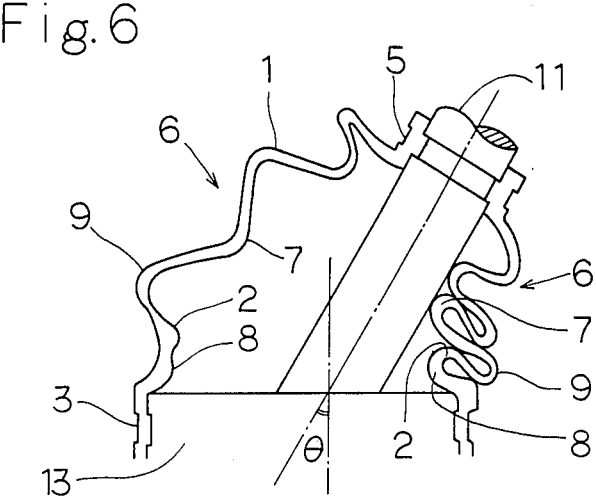
FIG. 6 is an X-ray fluoroscopic view of the boot shown in FIG. 4 in a case where the crossing angle $\theta$ of the driving shaft is 30°.
Figure 7:
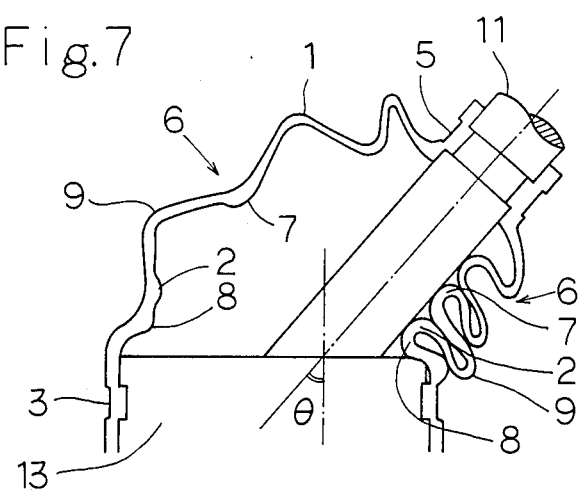
FIG. 7 is a X-ray fluoroscopic view of the boot shown in FIG. 4 in a case where the crossing angle $\theta$ of the driving shaft is 41°.
Figure 8:
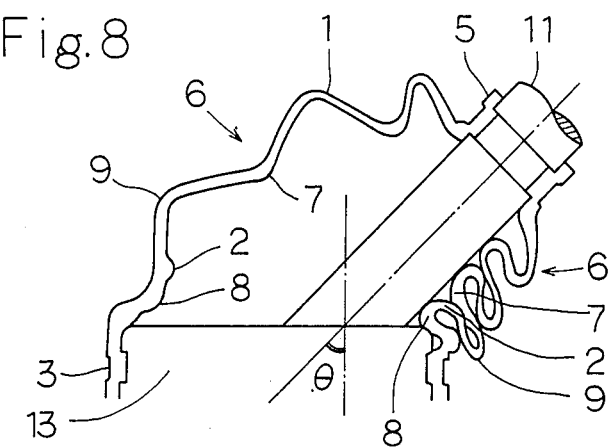
FIG. 8 is an X-ray fluoroscopic view of the boot shown in FIG. 4 in a case where the crossing angle $\theta$ of the driving shaft is 45°.

Next, the functions of this embodiment will be described hereinafter (FIGS. 6 to 8).

FIG. 6 is an X-ray fluoroscopic view showing the distorted stage of the bellows 7 in a case where the crossing movement of $\theta = 41°$ between the driving shaft 11 and the socket 13 is performed. FIGS. 7 and 8 show the same states as in FIG. 6, but where the crossing angles $\theta$ are 41° and 45°, respectively.

It is found from FIG. 6 that when the driving shaft 11 performs the crossing movement with $\theta = 30°$, the convex strip 2 which is formed on the sidewardly inclined surface of the first crest on the inner side of the first trough pushes the second trough 7 into the compressed portion of the bellows 7 and the second trough is moved to the side of the small-diameter ring 5, unlike the case with the conventional boot (shown in FIG. 3). Therefore, no concentration of the compression distortion is produced in the second trough 7, in particular, as is produced in the portion A of the conventional boot.

If the crossing angle is increased, the second trough 7 is pushed by the convex strip 2 and moved to the side of the small-diameter ring 5 in a similar manner to the above, without producing any concentration of the compression distortion (FIGS. 7 and 8).

As described above, it is desirable to determine the size (height) of the convex strip 2 so that it contacts the second trough 7 when the crossing angle $\theta$ of the driving shaft 11 becomes 25° or more. The sectional form of the convex strip 2 is limited to the approximately semicircular form shown in the figures.

On the other hand, a convex strip 2a (shown by a virtual line in FIG. 5) may be formed on the sidewardly inclined surface of the first crest 9 on the inner side of the second trough, this being the position which comes into contact with the above-described convex strip 2, and even if no convex strip 2 is formed on the side of the first crest, the same effect as is described above in relation to the convex strip 22 is produced.

When the convex strips are formed on both the first trough 8 and second trough 7, the above-described function is produced with even greater certainty.

In the above description, the problem of the concentration of compression distortion in the troughs following the second trough towards the side of the small-diameter ring 5 can be solved because each trough is deep (its circumferential diameter is small) and is not held between the driving shaft 11 and any of the troughs towards the side of the larger-diameter ring 3 adjacent the trough being considered.

Though this embodiment uses a bellows 7 having three crests, the number of crests may be four or five.

Durability tests were carried out under the conditions described below with respect to the boots (made of CR) shown in FIG. 4 (this embodiment) and FIG. 2 (the conventional boot). The results obtained are shown in Table 1, wherein it can be seen that the durability of the boot of the present invention is remarkably increased as compared with the conventional boot.

Heating conditions: Grease was enclosed in the boot which was then heated at 100° C. for 70 hours before conducting the experiment.

Maximum crossing angle ($\theta$); 30°
Rotational speed; 50 rpm
Atmospheric temperature; −43° C.

TABLE 1

Figure 1:
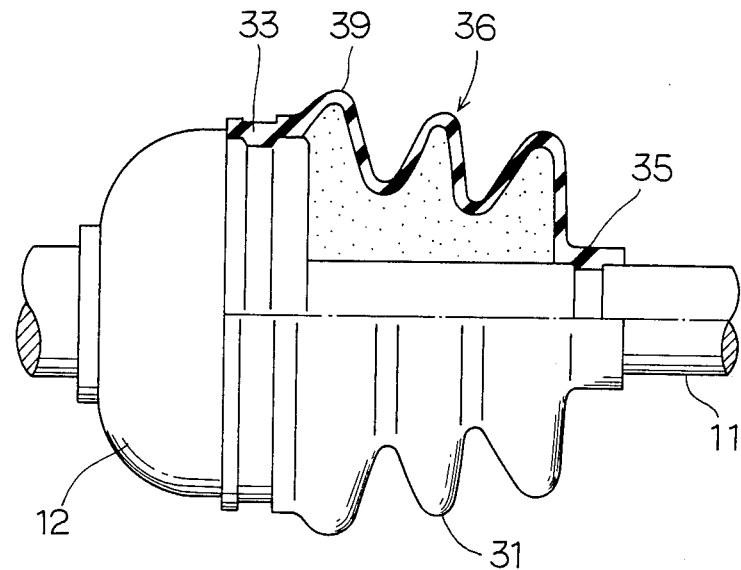
FIG. 1 is a half sectional view of a boot-mounting situation of the conventional type in which the first crest is directly connected to the large-diameter ring.

| | Experimental results |
|---|---|
| Embodiment (FIG. 1) | No crack initiation after 3.5 hr. |
| Conventional boot (FIG. 7) | Crack initiation at the second trough after 2 hr. |

We claim:
1. A mechanical shaft joint boot made of a polymeric elastomer comprising:
 (a) a large-diameter ring provided at a first end of said boot;
 (b) a small-diameter ring provided at a second end of said boot;
 (c) a corrugated bellows formed between said large-diameter ring and said small-diameter ring and comprising an alternating series of troughs and crests; each trough comprising a radially inwardly-convex apex flanked on opposite sides by a first oblique side wall disposed nearer said first end of said boot and a second oblique side wall disposed nearer said second end of said boot, said first and second side walls of each trough diverging from one another as they extend away from the respective said apex; and each crest comprising a radially outwardly convex apex flanked on opposite sides by a first oblique side wall disposed nearer said first end of said boot and a second oblique side wall disposed nearer said second end of said boot, said first and second side walls of each crest diverging from one another as they extend away from the respective said apex; the second side wall of each said trough which is flanked towards said second end of said boot by a respective said crest also constituting the first side wall of such crest, and the second side wall of each said crest which is flanked towards said second end of said boot by a respective trough also constituting the first side wall of such trough;

(d) said series including a first said crest and being the crest disposed nearest said first end of said boot;

(e) said series including a first said trough, said first trough flanking said first crest and being formed between said large-diameter ring and said first crest;

(f) a second said trough flanking said first crest and being formed between said first crest and said small diameter ring, the internal diameter of said apex of said second trough being smaller than that of said first trough; and (g) a circumferentially extending strip which is convex in transverse cross-sectional shape and which is formed internally of said bellows on one of the second side wall of said first trough and the first side wall of said second trough at a site which is longitudinally displaced from the apex of the respective said trough and which comes into contact with the other of the first side wall of said second trough and the second side wall of said first trough on a side of said bellows which becomes compressed during a crossing movement of said bellows.

2. The mechanical shaft joint boot of claim 1, wherein:

a second said strip also is formed internally of said bellows on the other of said first side wall of said second trough and said second side wall of said first trough; and said contact is made with said other of said first side wall of said second trough and said second side wall of said first trough at least partly via said second said strip.

3. The mechanical shaft joint boot of claim 1, wherein:

a second said strip also is formed internally of said bellows on the other of said first side wall of said second trough and said second side wall of said first trough; and said contact is made with said other of said first side wall of said second trough and said second side wall of said first trough at least partly beside said second said strip.

* * * * *